G. H. RECHTENBACH.
THRESHER TOOTH.
APPLICATION FILED JULY 8, 1907.

911,157.

Patented Feb. 2, 1909.

2 SHEETS—SHEET 1.

Inventor
George H. Rechtenbach

Witnesses
G. R. Thomas
H. G. Smith

By Chandlee & Chandlee
Attorneys

G. H. RECHTENBACH.
THRESHER TOOTH.
APPLICATION FILED JULY 8, 1907.
911,157.
Patented Feb. 2, 1909.
2 SHEETS—SHEET 2.
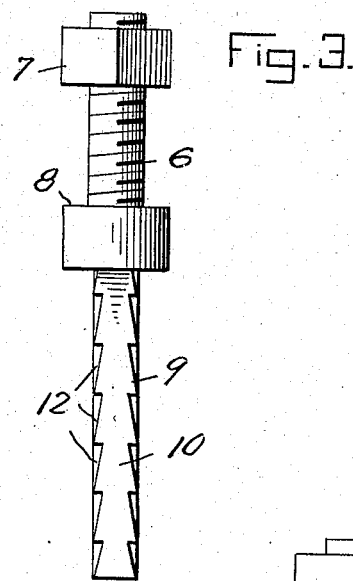
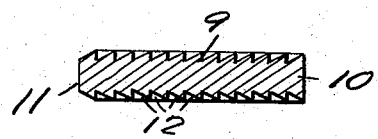
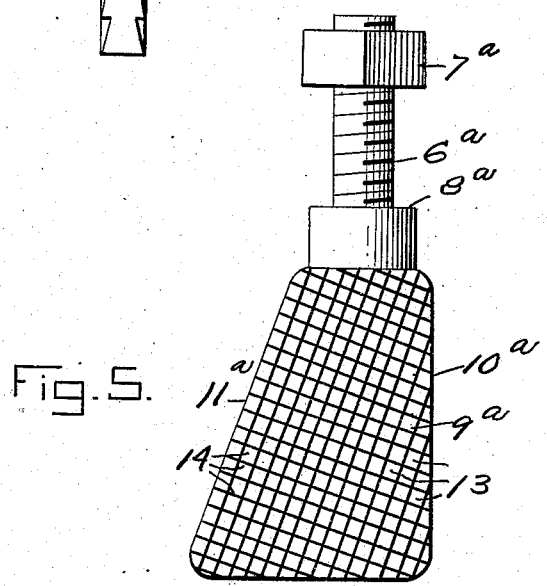
Inventor
George H. Rechtenbach
Witnesses
G. R. Thomas
H. G. Smith
By Chandlee & Chandlee
Attorneys

UNITED STATES PATENT OFFICE.

GEORGE H. RECHTENBACH, OF BRIDGEWATER, IOWA.

THRESHER-TOOTH.

No. 911,157.  Specification of Letters Patent.  Patented Feb. 2, 1909.

Application filed July 8, 1907. Serial No. 382,645.

*To all whom it may concern:*

Be it known that I, GEORGE H. RECHTENBACH, a citizen of the United States, residing at Bridgewater, in the county of Adair, State of Iowa, have invented certain new and useful Improvements in Thresher-Teeth; and I do hereby declare the following to be a full, clear, and exact description of the invention, such as will enable others skilled in the art to which it appertains to make and use the same.

This invention relates to thresher teeth.

More specifically the tooth belongs to that class which are corrugated and is designed to overcome numerous shortcomings of such teeth of this class as are now in use.

The present form of teeth of this class have their corrugations extending longitudinally and opening only through the outer end of the tooth but I have found that in the use of such a construction of tooth, the head of a spear of wheat is caught, during its passage between the cylinder and concave, in one of the corrugations and that it may or may not be hulled according to its size and to the degree in which it is received in the corrugation. Considerable wheat is therefore wasted owing to the fact that it is practically protected during such passage.

In carrying out my invention I employ a tooth including a shank and a flattened body portion which is provided with corrugations extending parallel with respect to each other and with respect to one edge of the said body portion which edge is oblique with respect to an opposite edge, the corrugations being in this manner formed to open through the said opposite edge and through the outer end of the body portion.

The teeth of the cylinder and of the concave are placed in opposition and consequently as the teeth of the two elements pass, the heads of the spears of wheat are acted upon in a more positive manner than is at present the case.

Figure 1:
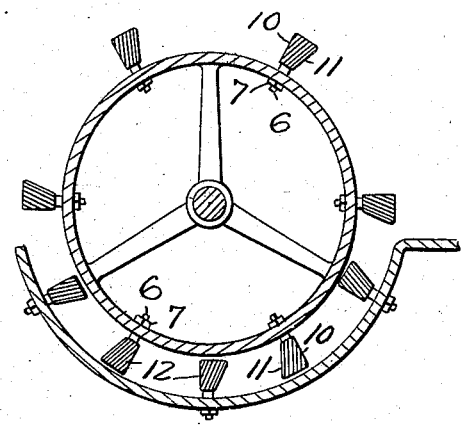
Figure 2:
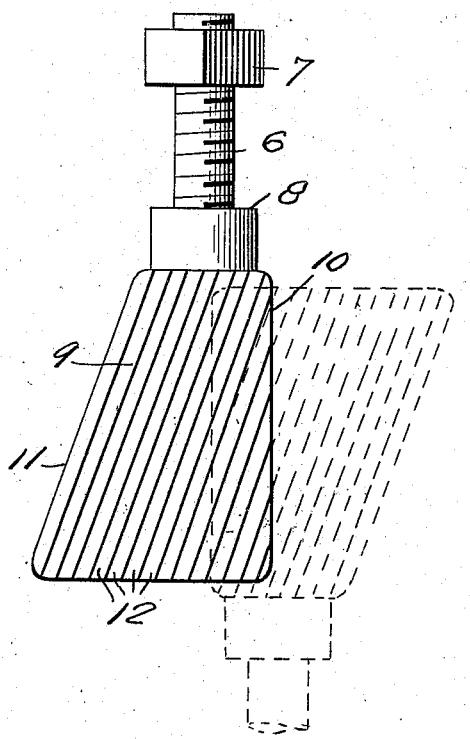

In the accompanying drawings, Figure 1 is a vertical sectional view through the cylinder and concave for the threshing machine showing the manner of positioning the teeth upon the two elements, Fig. 2 is a detail side elevation of one of the teeth and showing in dotted lines the relative position of another tooth at the time of passing the first mentioned tooth, Fig. 3 is a front edge elevation of one of the teeth, Fig. 4 is a horizontal sectional view through the body portion of one of the teeth, and, Fig. 5 is a side elevation of a slightly modified form of tooth.

In the form of my invention illustrated in the first four figures of the drawings the tooth is shown as comprising a shank 6 which is threaded for the engagement thereon of a nut 7 and which is shouldered as at 8 to abut the working face of the cylinder or concave to which the tooth is applied as may be the case. The tooth also comprises a flat body portion 9 which has its forward edge 10 extended vertically and its rear edge oblique as indicated at 11. Formed in each of the side or working faces of the body 9 is a plurality of corrugations 12 and these corrugations extend parallel with respect to each other and in planes parallel to the oblique rear edge 11 of the body of the tooth. The corrugations therefore extend in such a direction that their valleys open through the forward side of the tooth body and also through the outer end of the tooth.

As clearly shown in Fig. 2 of the drawings, as each tooth upon the cylinder passes each tooth upon the concave, the ridges and valleys formed by corrugating the working faces of the two bodies are co-incident but this relation is gradually changed as the cylinder rotates so that the corrugations become non-coincident.

In the form of my invention illustrated in Fig. 5 of the drawings, the working faces of the tooth body are formed of intersecting corrugations 13 and 14, the corrugations 13 being extended, as in the case of the corrugations 12 in parallel relation with respect to each other and with respect to the oblique rear edge of the said body of the tooth and the corrugations 14 intersect these corrugations 13 in planes substantially at right angles thereto, they being also parallel with respect to each other.

What is claimed is:—

A tooth of the class described comprising a shank formed with an annular bearing shoulder of increased diameter with respect to the shank, a flattened body portion formed on the shoulder and having a front edge parallel with said shank and an inwardly inclined rear edge disposed diagonally with respect to said shank, a plurality of forwardly directed ribs forming teeth on opposite side faces of the body and extending longitudinally throughout the same in parallelism with said inclined rear edge to intersect the front and end edges of said body at an angle, and also to present an increased number of ribs at the free end edge thereof with respect to its opposite end edge, and a threaded nut engaging the shank for securing the bearing shoulder against a support.

In testimony whereof, I affix my signature, in presence of two witnesses.

GEORGE H. RECHTENBACH.

Witnesses:
W. J. SIMPSON,
WM. RECHTENBACH.